DATA READ-OUT APPARATUS

Filed June 6, 1955 7 Sheets-Sheet 1

INVENTOR,
Robert E. Boyden, Kenneth F. Oldenburg, Bryan F. Kuhne & John K. Linn
Fred N. Schwend
ATTORNEY March 8, 1960 R. E. BOYDEN ET AL 2,927,729

DATA READ-OUT APPARATUS

Filed June 6, 1955 7 Sheets-Sheet 2

INVENTOR,
Robert E. Boyden, Kenneth F. Oldenburg, Bryan F. Kuhne & John K. Linn

Fred N. Schwend
ATTORNEY

DATA READ-OUT APPARATUS

Filed June 6, 1955 7 Sheets-Sheet 3

INVENTOR,
Robert E. Boyden, Kenneth F. Oldenburg, Bryan F. Kuhne & John K. Linn

ATTORNEY

INVENTOR,
Robert E. Boyden, Kenneth F. Oldenburg, Bryan F. Kuhne & John K. Linn
Fred M. Schwend
ATTORNEY INVENTORS,
Robert E. Boyden, Kenneth F. Oldenburg, Bryan F. Kuhne & John K. Linn Fred M. Schwend
ATTORNEY March 8, 1960 R. E. BOYDEN ET AL 2,927,729

DATA READ-OUT APPARATUS

Filed June 6, 1955 7 Sheets-Sheet 6

INVENTOR,
Robert E. Boyden, Kenneth F. Oldenburg, Bryan F. Kuhne & John K. Linn

ATTORNEY

DATA READ-OUT APPARATUS

Filed June 6, 1955 7 Sheets-Sheet 7

INVENTOR,
Robert E. Boyden, Kenneth F. Oldenburg, Bryan F. Kuhne & John K. Linn

Fred N. Schwend
ATTORNEY

United States Patent Office 2,927,729

Patented Mar. 8, 1960

2,927,729

DATA READ-OUT APPARATUS

Robert E. Boyden, San Gabriel, Kenneth F. Oldenburg, Monterey Park, Bryan F. Kuhne, Duarte, and John K. Linn, Los Angeles, Calif., assignors to Clary Corporation, San Gabriel, Calif., a corporation of California Application June 6, 1955, Serial No. 513,365

6 Claims. (Cl. 235—60.29)

This invention relates to apparatus for recording information on a record medium such as punched tape whereby such record medium is prepared automatically as an incident to operation of a calculating or the like machine.

It is desirable in many instances, and during the operation of a calculating machine or the like, to prepare a record medium which will record factors and/or results of a calculation carried out by the machine. This record medium is in a form such that it may be utilized to subsequently and automatically control other types of machines, i.e. other calculating machines, card punching machines, printers, tabulators, etc., or to transmit the information recorded thereon via wire or wireless communication apparatus to distant points.

One object of the present invention is to provide a recording apparatus for a record medium, which apparatus is controlled by a calculating machine or the like and which will not affect operation of the machine.

Another object is to provide a record medium recording apparatus which may be readily applied to present types of calculating machines of the foregoing type.

Another object is to provide a record medium recording apparatus controlled by a calculating mechine or the like which will prevent operation of the machine until the factors and/or result of a previous calculation has been recorded on the medium.

The manner in which the above and other objects of the invention are accomplished will be readily understood on reference to the following specification when read in conjunction with the accompanying drawings, wherein.

Figures 1, 2, 3:
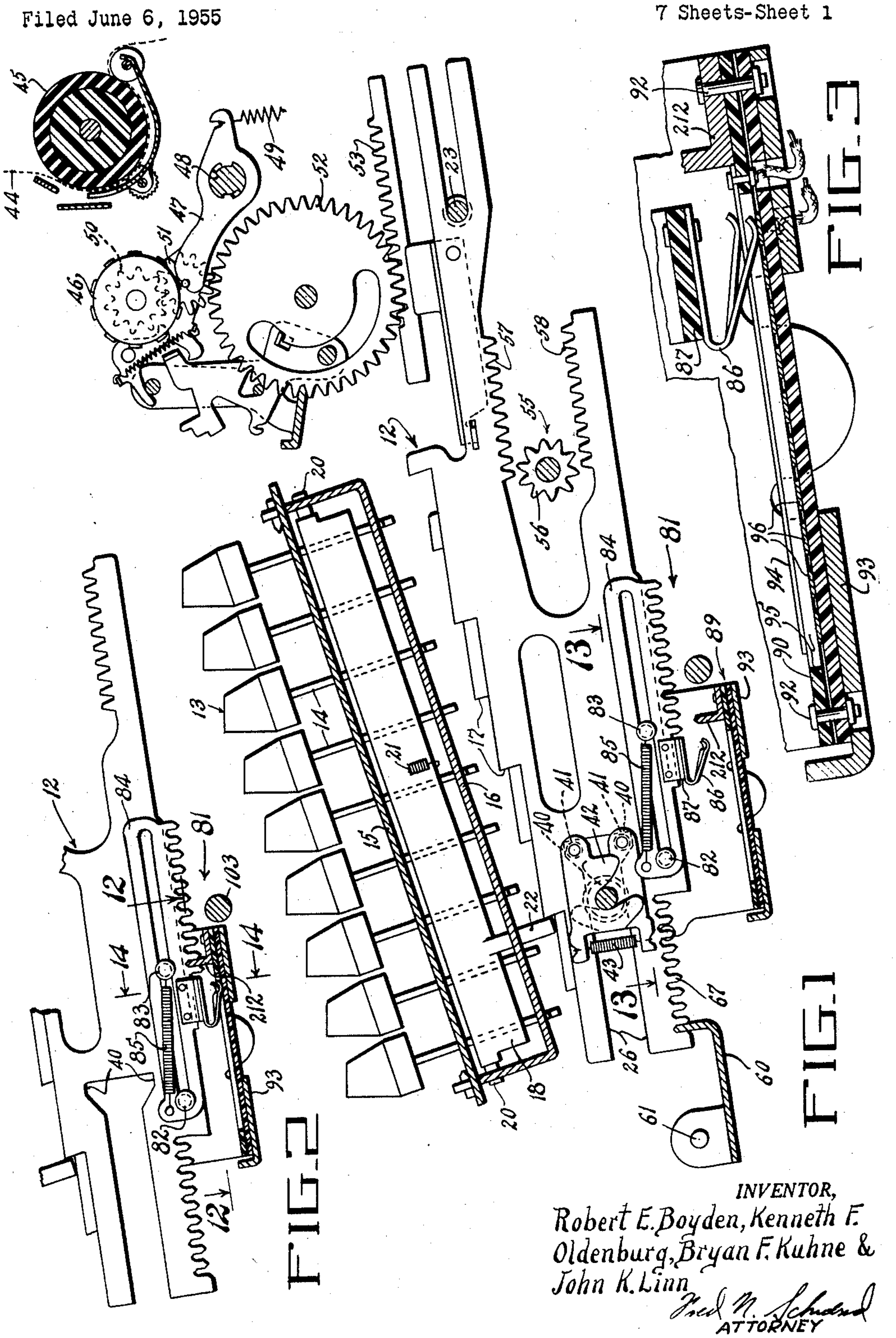
Fig. 1 is a longitudinal sectional view of an adding machine incorporating the contact devices pertaining to the present invention and showing the parts in their normal full cycle position.
Fig. 2 is a fragmentary view of part of the machine shown in Fig. 1, illustrating the parts in positions which they occupy during part of a cycle.
Fig. 3 is an enlarged fragmentary view of the brushes and contact plate assembly.

14—14 of Fig. 2, illustrating the connections between the auxiliary rack brushes and the contact plate assembly.

Figure 7:
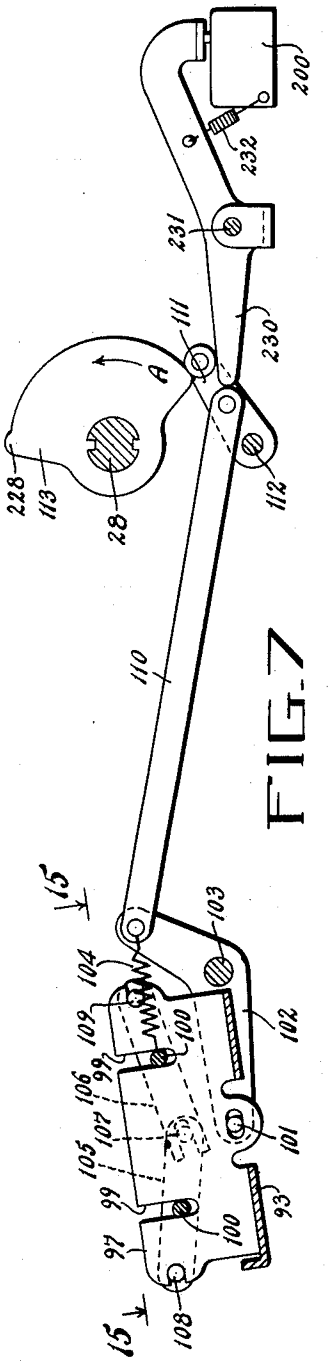
Figs. 7, 8 and 9 are sectional views illustrating, in different cyclic phases, the mechanism for positioning the contact plate assembly.
Figures 14, 15:
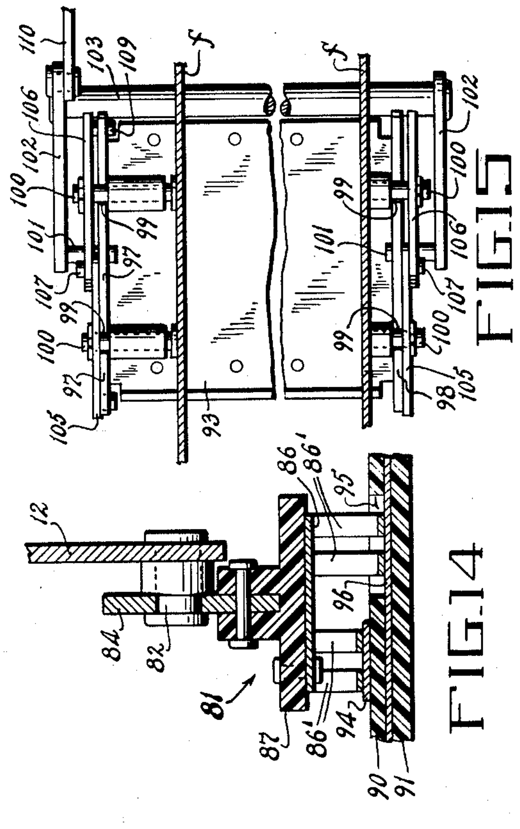
Fig. 14 is a transverse sectional view taken along lines
Figure 13:
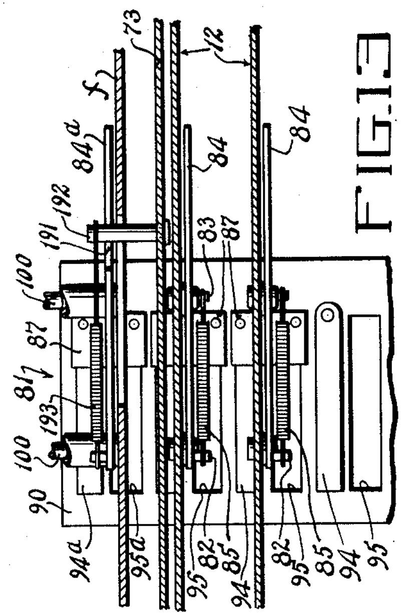
Fig. 13 is a sectional plan view taken along lines 13—13 of Fig. 1

Fig. 15 is a sectional plan view, with parts broken away, of the mechanism for raising and lowering the contact plate assembly and is taken along the lines 15—15 of Fig. 7.

Figure 16:
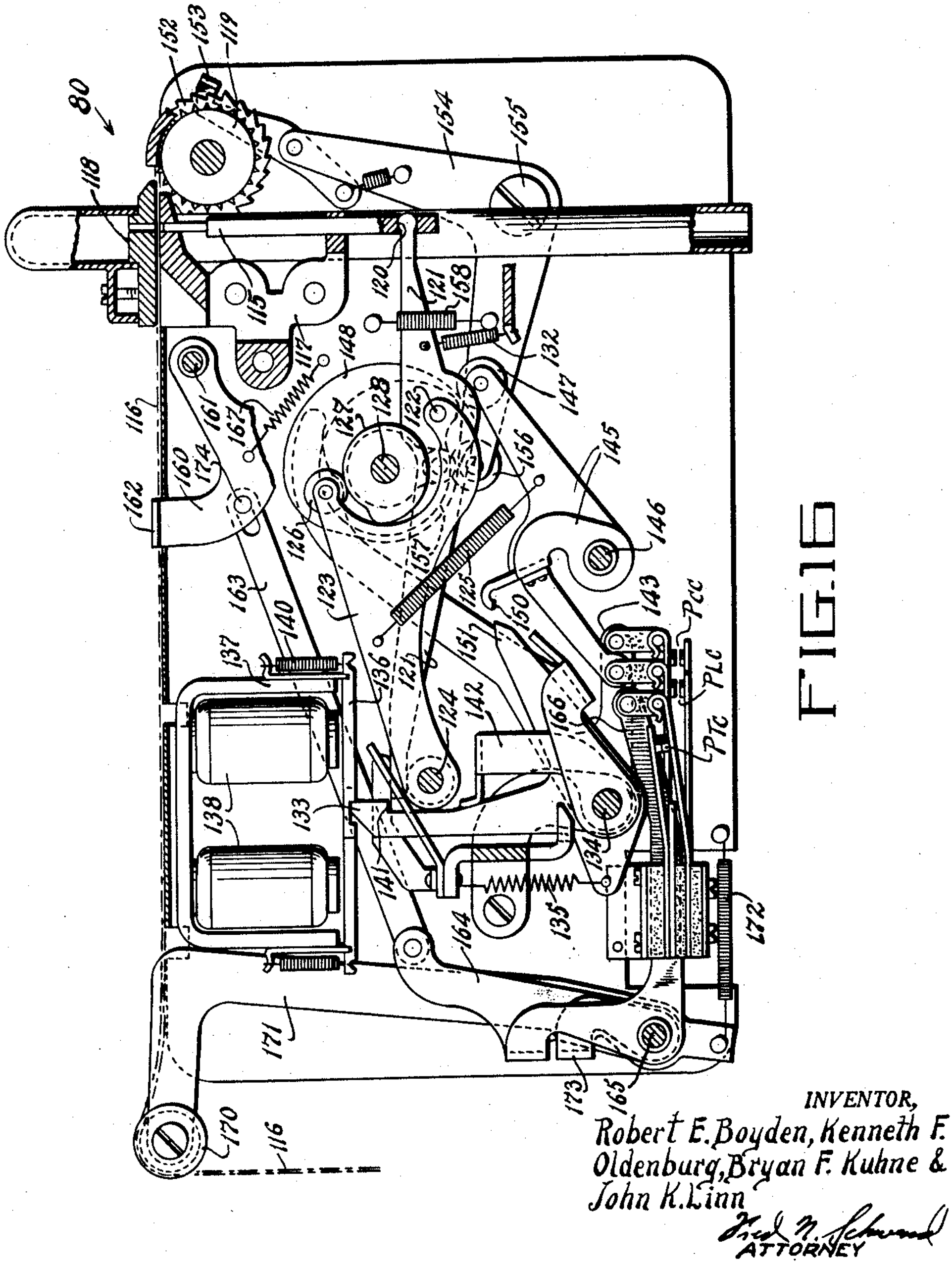

Fig. 16 is a sectional view through a typical tape punch device associated with the present invention.

Figure 17:
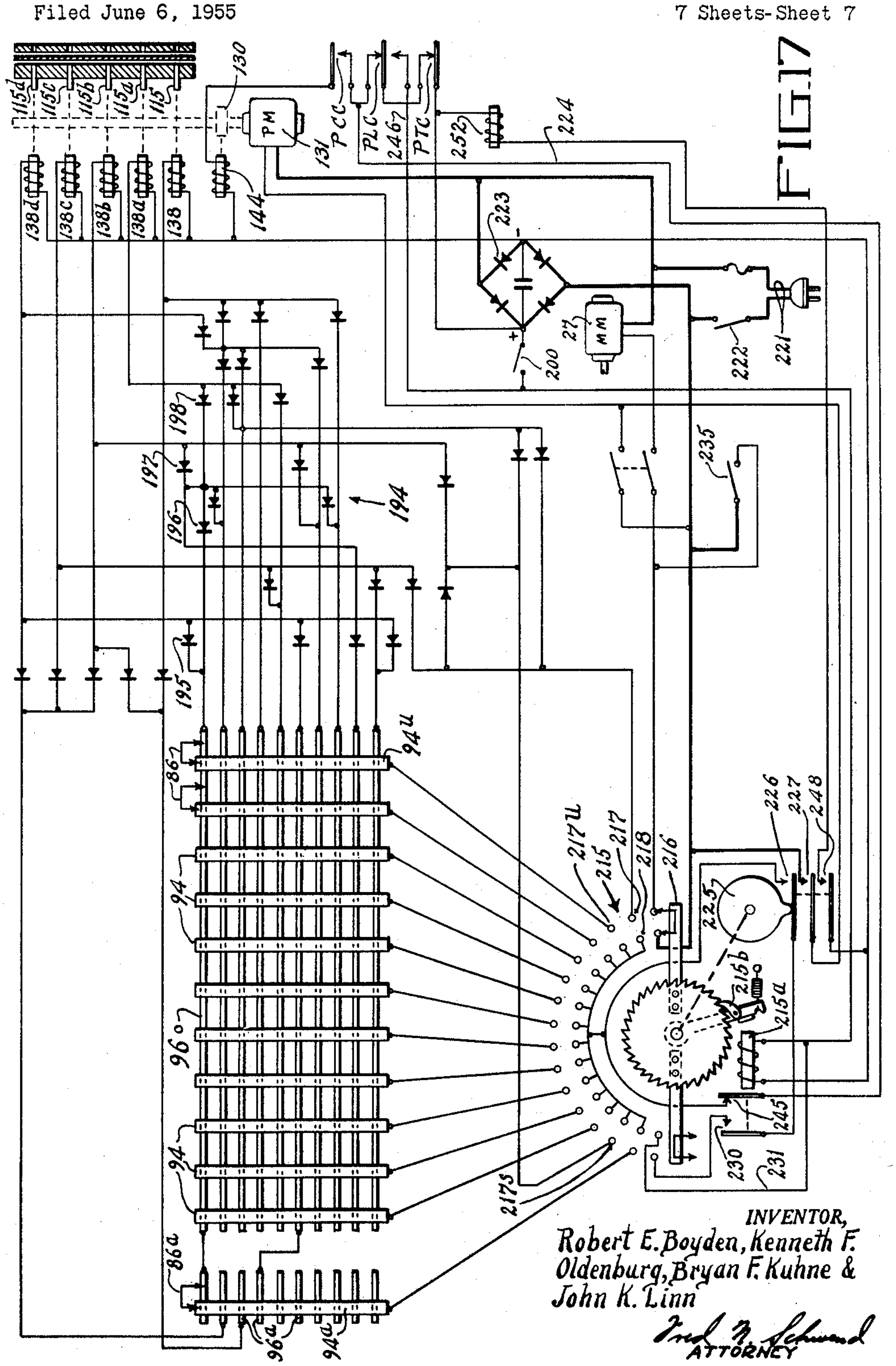

Fig. 17 is a circuit diagram illustrating a circuit connection for controlling the punching device.

The adding machine, generally indicated at 11, Fig. 1, is basically similar to the well-known commercially available Clary adding machine with the addition thereto of electric contact assemblies and controls therefor as will be described in detail hereinafter. Reference is hereby made to the R. E. Boyden, Patent No. 2,583,810, issued on Januray 29, 1952; the E. P. Drake, Patent No. 2,472,696, issued on June 7, 1949; and the Bennett, et al, Patent Serial No. 334,632, now Patent No. 2,744,682, filed on February 2, 1953, for details of the basic Clary machine. Therefore, only those portions of the machine which relate to or form part of the present invention will be described in detail herein. However, it is to be understood that the invention is not limited to the particular machine disclosed and may be applied to any similar machine.

The machine is of a full key keyboard type and comprises a series of denominationally arranged differential actuator racks 12, each having associate therewith a band of nine amount keys 13, ranging in digital value from 1 to 9.

Each of the keys comprises a key stem 14 guided for vertical movement in aligned slots formed in a top plate 15 and a bottom plate 16. The latter plates form a keyboard frame supported by the frame of the machine. The lower edges of the key stems 14 cooperate with spaced shoulders 17 formed on the aligned racks 12 to limit the forward advancement of each rack to a number of increments corresponding to the value of the depressed key in the associated bank.

Spring means, not shown, are provided for normally holding the various keys in their illustrated raised positions and means are further provided for latching any key in rack controlling position upon depression thereof. For this purpose, each key has a cam lobe, not shown, formed along one edge thereof and arranged so that when the key is depressed it engages a locking bail 18 pivoted at opposite ends thereof to front and rear upstanding walls of the plate 16 by trunnion bearings 20. As a key is depressed it will rock the bail 18 outwardly and as the cam lobe passes below the bail into rack limiting position, the bail will retract partially under the action of a spring 21 to a position wherein it latches the key depressed.

A zero block 22 depends from the locking bail 18 and when no key in a bank associated with a rack is depressed, the bail will locate the zero block in a position directly in front of one of the stop shoulders 17 of the associated rack, thereby preventing substantial forward movement of the rack during a subsequent cycle of the machine. However, when any amount key in the bank is depressed and latched down, locking bail 18 will be held outward sufficiently to maintain the zero block out of the path of the aligned rack.

Figures 10, 11:
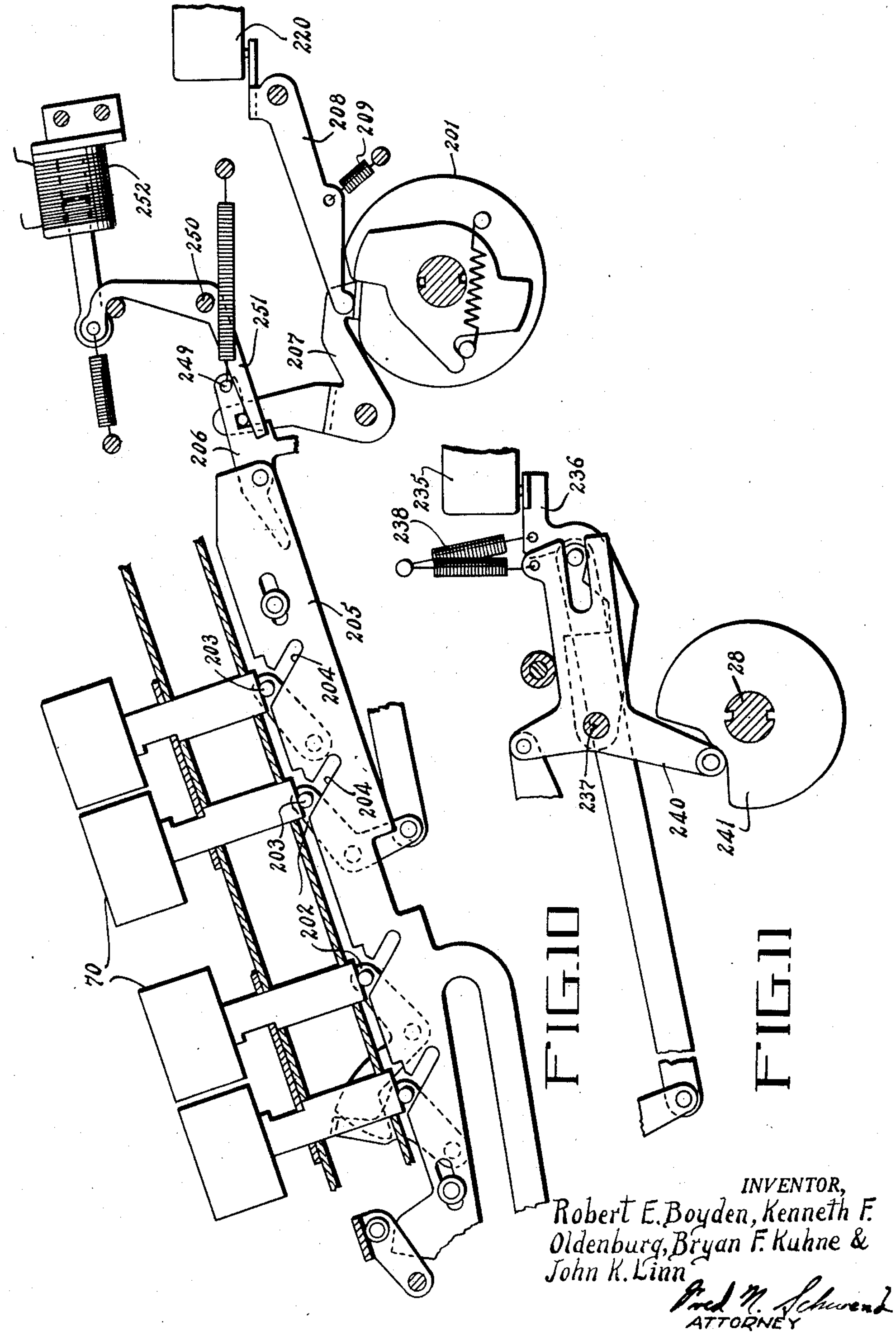
Fig. 10 is a sectional view illustrating the machine clutch and motor switch controls.
Fig. 11 is a sectional view illustrating additional machine controls.

The machine is driven by a motor diagrammatically indicated at 27, Fig. 17, through a cyclic clutch, 201, Fig. 10, the driven side of which is operably connected to a rotatable drive shaft 28 (also Figs. 4, 5, 7, 8 and 9), the shaft rotating one complete revolution during each cycle of the machine.

Figures 4, 5, 6:
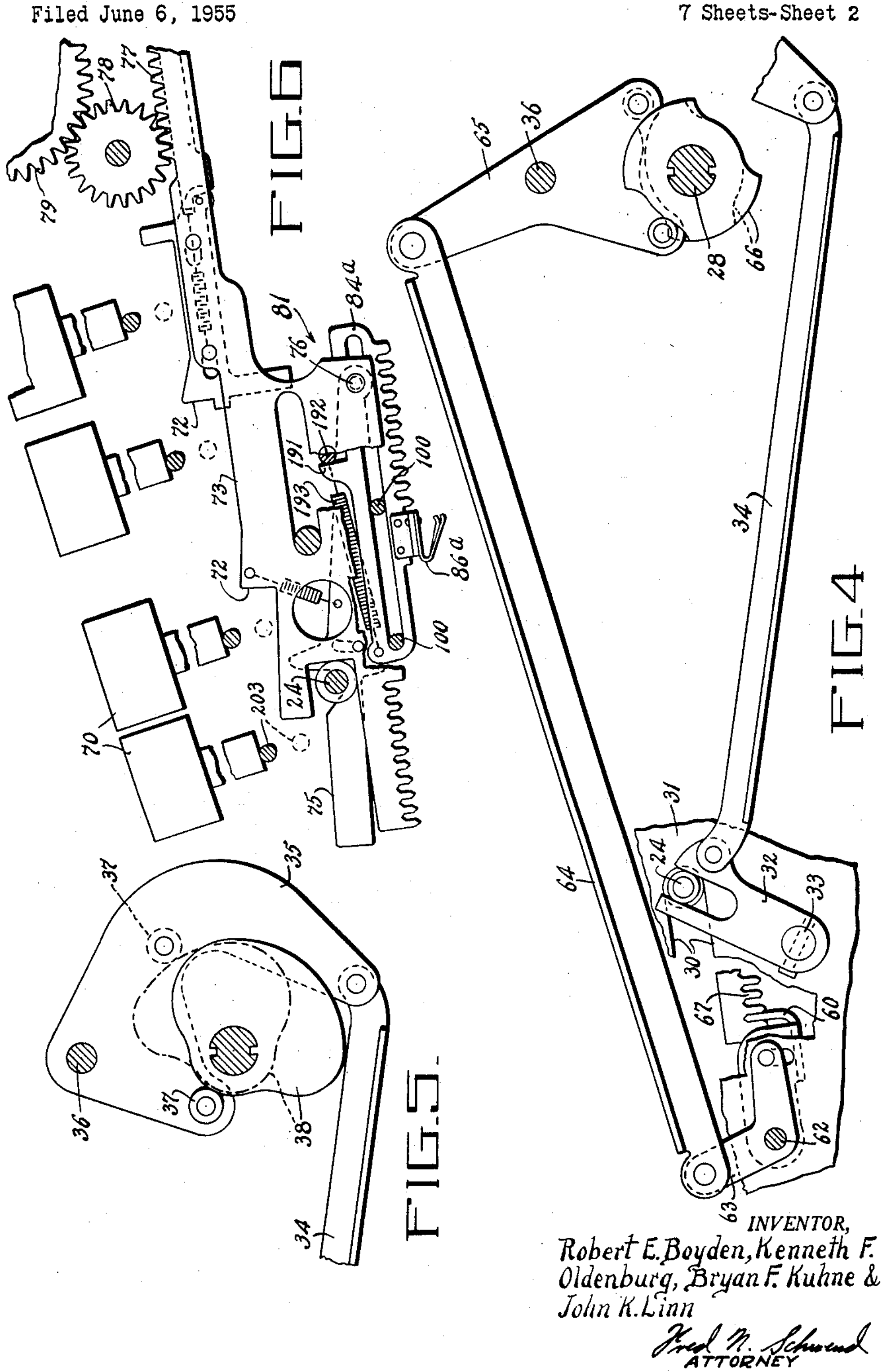
Fig. 4 is a sectional view through the machine illustrating the rack drive and rack lock operating devices.
Fig. 5 is a sectional view illustrating an additional portion of the rack drive mechanism.
Fig. 6 is a sectional view illustrating part of the machine control bars and symbol printing mechanism.

The machine is controlled to perform different calculations, i.e. add, subtract, totalling, etc., by depressible control bars certain of which are shown at 70 (Figs. 6 and 10). Upon depression of any of these bars, its keystem will rock a bell crank 202 against the action of a spring (not shown). A pin 203 in each bell crank 202 is engageable in a camming slot 204 formed in a clutch control bar 205. Thus, as a control bar is depressed its pin 203 will cam the control bar 205 to the left, actuating a hook 206 to rock a clutch dog 207 counterclockwise and thus enable the clutch 201 to engage. The clutch dog is effective to rock a switch control lever 208 clockwise against the action of a spring 209 to effect closing of a double pole motor switch 220.

Means are provided for causing the shaft 28 to yieldably advance the various racks 12 toward the left of Fig. 1 during the first part of a machine cycle and to return the racks to their illustrated home positions during the latter part of the cycle. For this purpose the rack shaft 24, Fig. 4, is mounted in slots 30 formed in machine side plates 31 and is embraced at opposite ends thereof by bifurcated arms 32 fixed to the rock shaft 33. One of the arms 32 is connected by a link 34 to a cam follower 35, see also Fig. 5. The cam follower is pivotally supported at 36 and is provided with rollers 37 which follow respective complementary cams 38 attached to the drive shaft 28.

In order to yieldably advance the various racks during forward advancement of the shaft 24, each rack has opposed notches 40 (Fig. 2) located at the closed end of its slot 26, the notches being normally engaged by rollers 41 carried by pawls 42. The latter are pivotally mounted in opposed relation on the shaft 24 and are yieldably forced apart by a spring 43 extending therebetween to normally hold the rollers 41 in the notches 40. Thus, during advancement of the racks, and when one thereof engages a depressed key stem, the rollers 41 will ride out of the notches 40 and along the edges of the slot 26 in that rack.

The various values, represented by the numerical positions to which the racks 12 are advanced, are printed on a paper tape 44 which is fed around a platen 45 to a printing station where the value represented by the positioning of the racks is printed.

The printer comprises a series of numeral printing wheels 46, each operatively entrained with a respective one of the racks 12. Each printer wheel has spaced around its periphery a series of digit type ranging in value from 0 to 9. Each wheel 46 is rotatably mounted on a separate lever 47 loosely keyed on a printer control shaft 48 and spring urged clockwise by tension spring 49. A gear 50 integral with each printer wheel meshes with a gear 51 also carried by the respective arm 47. Except during printing operations, the levers 47 are held in their positions shown wherein the gears 51 mesh with associated idler gears 52. The latter are continuously in mesh with offset rack sections 53 carried by the various racks 12 which are slideably supported at their rear ends by a stationary shaft 23.

The racks 12 are also effected to enter amounts into an accumulator generally indicated at 55, the latter comprising a series of denominational arranged accumulator gears 56. The accumulator gears are normally located out of mesh with upper and lower rack sections 57 and 58 formed on the various racks. During additive entry operations of the machine, the accumulator is raised to mesh the accumulator gears with the rack sections 57 just prior to forward advancement of the racks and are returned to the neutral position to demesh the gears at approximately 180° in the cycle. During subtractive entries and totaling operations, the accumulator is lowered to mesh the accumulator gears of the lower rack sections 58 just prior to advancement of racks and is thereafter returned to neutral before return of the racks.

Means are provided to lock the various racks 12 in differentially advanced positions during the printing phase of the machine cycle, i.e. at approximately 180°. For this purpose, a rack lock bail 60 is pivotally supported at 61 and 62, Figs. 1 and 4, to the side frames, i.e. 31, of the machine.

The bail 60 is connected by an arm 63 and link 64 to a cam follower 65 which cooperates with complementary cams 66 keyed on the drive shaft 28. The cams 66 and rock bail controlling linkage are effective to cause the lock bail to engage between any of a series of teeth 67 on each of the racks during both the full cycle position and the printing phase which occurs at approximately 180° in each cycle.

Means are provided to print symbols indicative to the type of operation performed by the machine. Such symbol control means is under control of the series of depressible machine control bars 70, each of which is effective upon depression to cause a different type of operation, i.e. subtract, totaling, subtotaling, etc. When a control bar is depressed the aforementioned associated pin 203 is moved into the path of an associated stop shoulder 72 formed on a symbol rack 73.

The symbol rack 73 is supported in a manner similar to the racks 12 and is yieldably connected to the rack drive shaft 24. For this purpose, a detent pawl 75 is pivoted to the rack at 76 and is spring urged upwardly to normally maintain a detent notch therein in embracement with the drive shaft 24. Thus, the rack is moved forwardly until one of its stop shoulders 72 engages a depressed pin 203 at which time the detent pawl will yield as the drive shaft continues its forward advance.

A rack section 77 is formed on the rack and is located in mesh with a pinion 78 which is entrained through an idler 79, similar to the idler 52, to a symbol printing wheel (not shown) similar to the printing wheels 46 but carrying on the periphery thereof a set of symbol type.

In order to transmit information from the adding machine to the recording device which in the present disclosure takes the form of a paper tape punch, generally indicated at 80, Fig. 16, a rack position sensing device 81, Figs. 1, 2, 6 and 13 to 15, inclusive, is provided. This device also forms a mechanical memory in that it retains information pertaining to the positioning of the racks after the latter have returned to their home positions and even after the machine cycle has been completed and until the next cycle has been initiated.

Slideably mounted on pins 82 and 83 fixed to each rack is an auxiliary rack 84. A spring 85 tensioned between the stud 83 and the rack 84 normally retains the latter in its position shown in Fig. 1 relative to the associated rack 12.

A generally U-shaped brush 86 is supported from each auxiliary rack 84 through a brush carrier 87 of insulating material such as plastic. Each of the brushes 86 is split to form a series of brush fingers 86', Fig. 14, engageable with a contact plate assembly generally indicated at 89 (Fig. 1). The latter comprises two superimposed plates 90 and 91 of insulating material secured together and to the top surface of a plate carrier 93 by bolts 92. Securely bonded or otherwise attached to the upper surface of the plate 90 are denominationally arranged feeder conductors or strips 94 which are adapted to be engaged by certain of the brush fingers of associated ones of the brushes 86. Such conductor strips extend parallel to the lengths of the racks. The remaining brush fingers of the various brushes are aligned with slots 95 formed in the upper plate 90 and are movable over a series of transversely extending digital conductors 96 securely bonded to the top surface of the plate 91 and each representing one of the digits from 0 to 9.

Normally, when the machine is at rest, the contact plate assembly is held in a raised position as shown in Figs. 2 and 3 whereby the brushes 86 engage the assembly to bridge across respective ones of the column feeder conductors 94 and certain of the digit conductors 96, depending upon the positions of the auxiliary racks. Also, at this time, an aligner 212 carried by the contact plate assembly is held in engagement with certain of the teeth of all of the auxiliary racks 84 to maintain the same in positions to which they were previously adjusted by the racks 12.

However, at the start of a machine cycle and before the main racks 12 are advanced, the contact plate assembly is lowered into its position shown in Fig. 1 and is held there until the main racks have advanced the auxiliary racks 84 to digitized positions. Before the main racks are returned from their digitized positions during the latter part of the cycle, the contact plate assembly is again raised, causing the aligner to lock the auxiliary racks in their newly adjusted positions until the early portion of the next cycle. For this purpose the mechanism shown particularly in Figs. 7, 8, 9 and 15 is provided.

The plate carrier 93 has upstanding flanges 97 and 98 at opposite ends thereof. These flanges are provided with vertical slots 99 which are guided over frame pins 100 fixed in the machine frames *f* and which permit raising and lowering of the carrier.

In order to enforce parallel vertical movement of the carrier 93, the flanges 97 and 98 are connected through pin and slot connections 101 to arms 102 which are attached at opposite ends of a rock shaft 103. The latter is pivoted in suitable bearings, not shown, carried by the machine side frames. A spring 104 extending between one of the arms 102 and one of the frame pins 100, urges the plate carrier 93 downwardly.

In order to prevent tilting of the plate carrier about the pin and slot connections 101, stabilizing links 105 and 106 are pivoted on the frame pins 100 at opposite sides of the machine and are inter-connected by pin and slot arrangements 107. The opposite ends of the links are connected by pin and slot connections 108 and 109 to the front and rear ends of the flanges.

In order to raise and lower the contact plate carrier 93 at different times, one of the arms 102 is connected by a link 110 to a cam follower 111. The latter is pivoted at 112 and follows a cam 113 having a high portion extending approximately half-way around its periphery.

When the machine is in its full cycle position the parts are arranged as shown in Fig. 7, the cam 113 holding the contact plate assembly in raised position.

Figure 8:
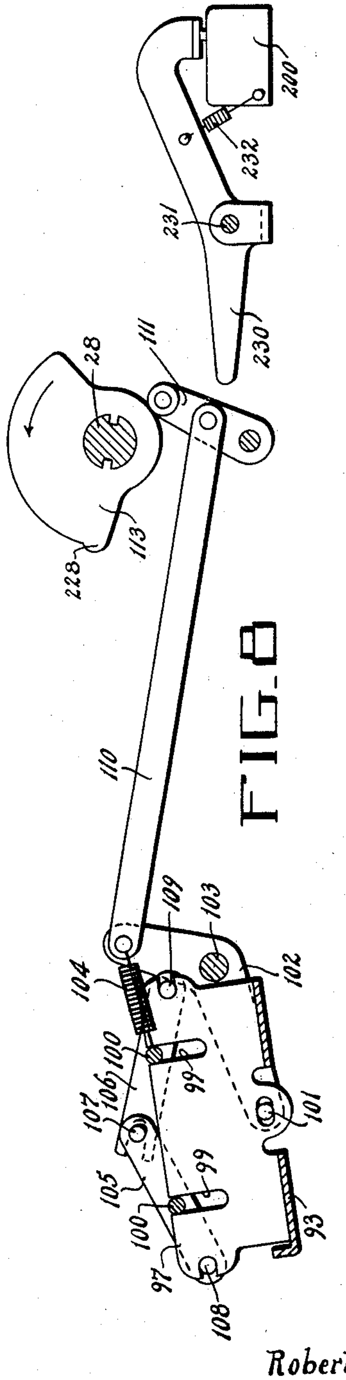
Figure 9:
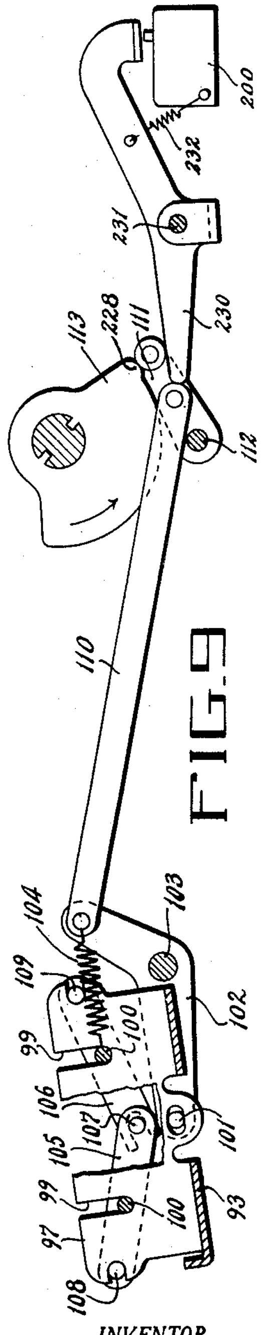

During a machine cycle, the shaft 28 is rotated in the direction of the arrow A whereby the cam 113 allows the follower 111 to drop off its high portion immediately after the start of the cycle allowing the parts to assume their positions shown in Fig. 8. At approximately 180° in the cycle, the cam 113 will pick up the cam follower 111, thereby moving the entrained linkage into the position shown in Fig. 9, whereupon the brushes 86 will become effective to establish circuit connections between the denominational strips 94 and different ones of digit strips 96 depending upon the newly adjusted positions of the auxiliary racks 84.

The cam 113 is also effective to cause momentarily closing of a switch 200 for purposes to be described later. For this purpose, the cam is provided with a small lobe 228 which when it engages the cam follower 111 rocks a switch lever 230 about its pivotal support 231 and against the action of a spring to release the normally closed switch 200. When the cam follower again engages the remaining high portion of the cam 113, the spring 232 will become effective to move the switch lever 230 to switch opening position.

The tape punch unit 80, Fig. 16, is disclosed in detail in the Blodgett Patent 2,700,466 issued on January 25, 1955. Therefore, the punch will be only generally described herein.

The punch unit comprises a series of punches, one of which is shown at 115. The punches are spaced in a line extending transversely across the paper tape indicated by the dot-dash lines 116. Each punch is slideably mounted in a guide block 117 and during a punch operation, certain ones of the punches are moved upwardly to perforate the tape and move into an aligned opening in a die block 118. Immediately after a punching operation a feed sprocket 119, which engages sprocket holes also perforated in the tape, advances the latter to the next blank punch code column.

Each punch is pivotally connected at 120 to a floating lever 121 pivotally mounted intermediate its ends on a rod 122. The latter is carried at its opposite ends by cam followers, one of which is shown at 123, fulcrumed at 124 and urged downwardly by a spring 125 to hold a roller 126 against a cam 127 suitably fastened to a motor driven shaft 128.

The shaft 128 is rotated once for each cycle of the punch through an electromagnetically controlled, cyclically operable clutch diagrammatically indicated at 130, Fig. 17, which is driven by a punch motor 131.

The left hand end of each of the floating levers 121 is normally free to swing up and down. The right hand end thereof is urged downwardly by a spring 132 to normally maintain its punch 115 in lowered position. In such condition, rotation of the shaft 128 and oscillation of the cam followers 123 would result merely in a free swinging of the levers 121 about their pivotal connections 120 without raising the punches.

Describing now the means for selectively conditioning the different punches for operation, a series of latch levers 133, one for each lever 121, are independently pivoted on a stationary shaft 134. The latter levers are normally latched in ineffective condition against tension springs 135 by latch armatures 136 pivotally supported by magnet frames 137. Electromagnets 138 are mounted on the frames 137.

When any magnet 138 is energized it will raise its armature 136 against the action of a spring 140, thereby releasing an associated latch lever 133 to position a latching shoulder 141 thereof over the left hand end of an aligned one of the levers 121. During an ensuing punch cycle, the lever 121 will now fulcrum about the latching shoulder 141, thus raising its punch 115 to perforate the tape.

When any latch lever 133 is tripped it forces a bail 142, also pivoted on shaft 134, clockwise causing an arm 143 thereof to close a set of contacts PCC, see also Fig. 17, located in circuit with an electromagnet 144 which is effective upon energization to engage the punch operating clutch 130.

Just after the start of each punch cycle and before appreciable movement of the levers 121, the latch levers 133 are locked in either tripped or untripped condition. For this purpose, a latch lock bail 145 is pivotally supported on a frame pin 146 and urged counterclockwise by the spring 125 to hold a roller 147 thereof in engagement with a cam 148 also fixed on the shaft 128. As the bail 145 is rocked counterclockwise urged by the spring 125 and under control of cam 148, the bail portion 150 thereof will engage spearshaped heads 151 of the latch levers to locate the same in whichever positions they have been previously set. The bail 145 is also effective to throw a single pole, double throw switch PLC from its normal position shown in Fig. 17 to its alternate position and to thereafter return the same during the latter half of the punch cycle.

Means are provided for advancing the feed sprocket 119 after each punch operation. For this purpose, the sprocket has secured thereto a ratchet 152 engageable by a pawl 153 carried on a cam follower 154 which is fulcrumed at 155 and provided with a roller 156 which engages a feed cam 157. A spring 158 holds the follower 154 against the feed cam.

Means are provided to disable the tape punch either in the event of tape failure or excessive tape tension. For this purpose, a feeler lever 160 is pivoted at 161 and is provided with a laterally extending feeler finger 162 which rides over the top surface of the tape as the latter passes toward the punching station. The feeler lever is connected by a link 163 to a bail lever 164 pivotally mounted on a frame pin 165. One arm 166 of the bail lever is connected to a set of normally closed contacts PTC. When a break in the tape occurs or the tape is exhausted, a spring 167 becomes effective to rock the feeler lever 160 counterclockwise, actuating the link 163 and bail lever 164 to open the contacts PTC.

The tape is also guided over a guide roller 170 on a bail lever 171 which is pivoted on the pin 165 and normally held in the position shown by a tension spring 172. The bail lever has a bail 173 which extends behind a portion of the lever 164. Thus, when excessive tension is developed in the tape, the lever 171 will be rocked clockwise, thereby picking up the lever 164 to open the contacts PCC in the same manner as is effected by the feeler lever 160. To permit such action a lost motion connection 174 is provided between the link 163 and in the feeler lever 160.

Figure 12:
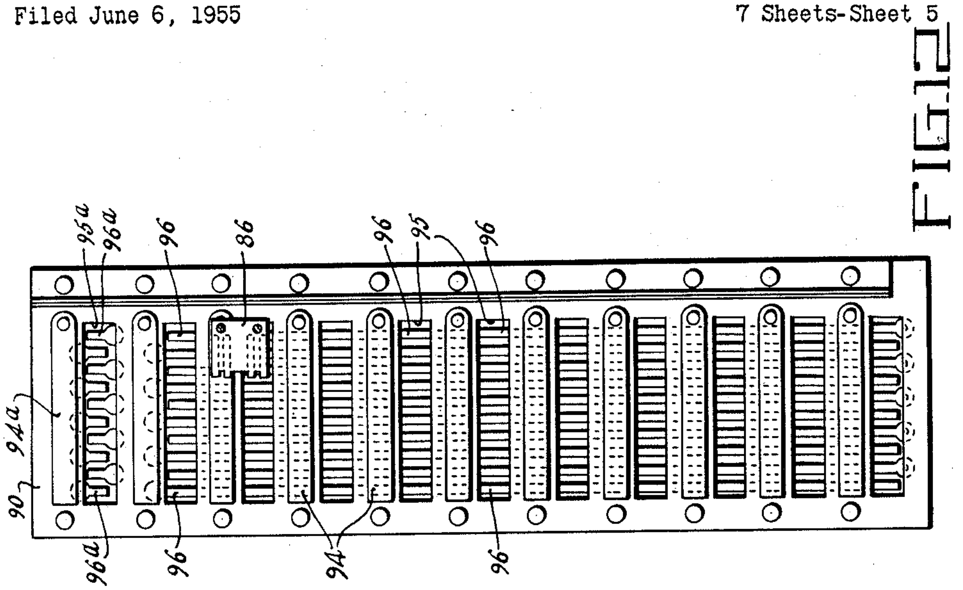
Fig. 12 is a plan view illustrating the contact plate assembly and is taken along the lines 12—12 of Fig. 2.

Describing now the circuit connections for controlling the punch unit, it should be first noted on reference to Figs. 6, 12 and 17 that a separate symbol information section is provided on the contact plate assembly so that a symbol code may be punched in the tape to indicate the type of operation performed by the machine. This section comprises a special auxiliary rack **84*a* guided over the fixed frame pins 100 and provided with a shoulder 191 aligned directly in front of a pin 192 attached to the symbol rack 73. A spring 193 tensioned between pin 192 and the slide 84*a*** normally maintains the slide in a rearmost position, as shown, relative to the symbol rack.

A brush **86*a* carried by the auxiliary rack 84*a* has brush fingers movable over a symbol feeder strip 94*a* bonded to the plate 90. Other brush fingers of the brush 86*a* are movable through a slot 95*a* in the plate 90 and over a series of short conductor strips 96*a* bonded to the plate 91 and aligned with the aforementioned digit conductor strips 96**.

During an adding machine cycle and after the various racks, including the symbol rack 73, have been advanced, the brush **86*a* will connect the feeder strip 94*a* with one of the strips 96*a* depending upon the position of the symbol rack at this time. However, in the embodiment illustrated by the bars 70 in Fig. 6, the symbol rack is movable through four increments only and the brush 86*a* is therefore effective to contact only four of the strips 96*a***.

A stepping switch generally indicated at 215 is provided to successively pick off the digital information from the different denominations of the machine, as well as the symbol information, and to transmit such information through a diode matrix generally indicated at 194 to the various punches.

In the example shown, a five channel code is employed utilizing five punches 115 to **115*d*, inclusive, controlled by punch control magnets 138 to 138*d*, respectively. The various digit conductors 96 are connected to the punch control magnets through different combinations of diodes in the matrix 194 to punch different numerical code patterns for the different digits 0 to 9. For example, the zero digit conductor 96° is connected through diodes 195, 196—197 and 198 to the punch control magnets 138*d*, 138*b* and 138*a***, respectively.

The switch arm 216 of stepping switch 215 is normally maintained in its illustrated home position when the apparatus is at rest. However, when the switch operates, the switch arm is effective to successively bridge different pairs of contacts located in two rows 217 and 218. The various contacts of the row 217, starting with contact **217*u* are connected to successively higher order denomination feeder conductors 94 of the contact plate assembly while the next to last contact is connected to the symbol feeder strip 94*a***.

It will be noted that the lower pole (Fig. 17) of the main switch 220 is connected in series with the motor circuit for the machine motor 27 across an A.C. power supply circuit 221. The upper pole of the main switch is connected in series with the motor circuit for the punch motor 131 also across the power supply line 221.

Assuming a master supply switch 222 in the power supply circuit to be closed, depression of any of the control bars 70 will cause engagement of the main clutch 201 (Fig. 10) as was described previously and will also effect closing of the main switch 220 to cause the adding machine to cycle and the punch motor 131 to operate.

A full wave rectifier 223 is connected across the power supply circuit 221, the positive side of the rectifier being connected to the aforementioned switch 200 and, through the normally closed contacts PTC, to the movable blade of the switch PLC. Thus, positive potential is normally applied through line 224 and normally closed contacts 245 operable by the stepping switch magnet **215*a* to all but the first and last contacts in the set 218**.

At approximately 180° in the cycle of the adding machine and as the contact plate assembly is raised to cause the brushes 86 to bridge the column feeder conductors 94 and different ones of the digit conductors 96, the switch 200 closes momentarily to energize the stepping switch magnet **215*a* by connecting the same in circuit across the D.C. terminals of the rectifier 223. Although the stepping pawl 215*b* is actuated at this time, the latter is not effective to advance the switch arm 216 until the magnet 215*a*** deenergizes.

Since the switch arm 216 normally completes the circuit for motor 27 when the stepping switch is in its home position and since the stepping switch will in most cases advance to its No. 1 position before the end of the adding machine cycle, means are provided to maintain the circuit for motor 27 completed until the end of the machine cycle. For this purpose, a switch 235, see also Fig. 11, is connected in series with the machine motor circuit across the home contacts of the stepping switch. The latter switch is of the normally closed type but is normally held open by a switch control lever 236 pivoted at 237 and spring urged toward switch opening position by a spring 238. The lever 236 is operable by a cam follower 240 controlled by a cam 241 having a high dwell portion extending around the major portion of its periphery.

As the switch 200 again opens due to passing of the cam lobe 228 (Fig. 9) past the follower 111, the stepping pawl **215*b* is spring returned and at this time advances the switch arm 216 to its No. 1 position. A cam 225 attached to the switch arm now advances to enable a set of off-normal contacts 226, 227, and 248 to close. The contacts 227 are connected in parallel with the upper pole of the main switch 220** and are thus effective to hold the punch motor circuit completed until the punching operation has finished and the stepping switch advanced around to home position even though the punch operation should continue after the adding machine cycle has finished.

As the switch arm 216 reaches its No. 1 position, it completes a circuit through appropriate diodes of matrix 194 to the punches 138, **138*a*, 138*c* and 138*d*. The contacts PCC will now close to engage the punch clutch 130 and a "Figure" code will thereby be punched on the tape, indicating that subsequently punched code patterns will represent figures or numerals. During this punch cycle, the switch PLC will be thrown to its alternate lower position, again (through line 246) momentarily energizing the step switch magnet 215*a* to step the switch arm 216 to its No. 2 position where it now completes a circuit through contact 217*u*, through the units column feeder conductor 94*u*, associated brush 86, a bridged digit conductor 96** and appropriate diode combination to the proper punch selecting magnets. The punch control clutch will again be engaged and the code pattern for the selected digit set up by the units column auxiliary rack will be punched in the tape. This series of events will be repeated until the complete field of the adding machine denominations or column has been scanned by the stepping switch and punched on the tape.

As the switch arm 216 reaches contact **217*s* a code pattern representing "symbols" will be punched indicating that the subsequently punched code pattern will represent a symbol. The switch arm will then advance to the symbol column position to complete a circuit through the column feeder conductor 94a, the bridging brush 86a** and the appropriate diode combination to the appropriate punch selecting magnets.

In its last position before reaching home, the stepping switch arm 216 will complete a circuit from the positive side of the rectifier 223 through contacts PLC, line 224, contacts 245, now closed contacts 226, contacts 230, switch arm 216, line 231 and step switch magnet 215a to the negative side of the rectifier to finally advance the switch to its illustrated home position. Here the off-normal contacts 226, 227 and 248 are opened to terminate the punch operation.

Means are provided to prevent continued recycling of the adding machine in the event that one of the control bars 70, Fig. 10, is held down after commencement of a cycle. For this purpose, the clutch dog operating hook 206 has a stud 249 overlying a bell crank 251 which is pivoted at 250 and connected to the armature of a solenoid 252. The latter is connected in circuit with the off-normal contacts 248 across the D.C. terminals of the rectifier 223. Thus, during the stepping switch operation the solenoid will be energized to uncouple the clutch control bar 205 from the clutch dog 207 so that the clutch will become automatically disengaged at the end of a current cycle even though one of the control bars 70 is held depressed at this time. It will be noted that the clutch dog, when once rocked to a counterclockwise position to cause engagement of the clutch 201 will be held in such position by the periphery of the clutch until near the end of the cycle so that the machine will continue to operate through such cycle.

Although we have described our invention in detail and have therefore used certain terms and languages herein, it is to be understood that the present disclosure is illustrative rather than restrictive and that changes and modifications may be made without departing from the spirit or scope of the invention as set forth in the claims appended hereto. For example, although the diode matrix 194 disclosed herein has been arranged to control operation of the punch unit in accordance with the well-known Baudot code, the matrix may be readily changed to operate in accordance with any other suitable code.

Having thus described the invention, what we desire to secure by United States Letters Patent is:

1. The combination with a cyclically operable calculating machine having value setting devices and a plurality of reciprocable racks differentially controlled thereby; a plurality of punches for punching code patterns in a record medium, and electromagnetic means including normally open circuits therefor for causing operation of said punches; of a plurality of switching devices, means forming lost motion connections between said switching devices and said racks for advancing said switching devices during advancement of said racks, a locking device for locking said switching devices in positions advanced by said racks, conductors carried by said locking device and connected to respective ones of said circuits, means automatically operable after advancement of said racks for moving said locking device into locking relation with said switching devices and for concurrently engaging said conductors with aligned ones of said switching devices to condition certain of said circuits corresponding to the numerical data registered by said machine, means for successively completing the circuits associated with different ones of said racks, spring means for returning said switching devices from advanced positions, and means operable by said machine during a succeeding cycle for releasing said locking device and for disengaging said switching devices.

2. In an apparatus of the class described, the combination with value setting devices, and a plurality of reciprocable actuators differentially controlled by said value setting devices; of electrical bridging brushes operatively connected to said actuators and movable thereby, a pair of superposed plates of insulating material located adjacent said brushes, a plurality of column conductors on the one of said plates located nearest said brushes, said column conductors extending parallel to the path of movement of said brushes, a plurality of digit conductors on the other said plates, said digit conductors extending transversely to the path of movement of said brushes, openings in said nearest plate whereby portions of said brushes may extend therethrough, a locking device integral with said plates and adapted to lock said brushes in position, and means for causing relative movement of said plates and said brushes toward each other whereby to concurrently engage each of said brushes with one of said column conductors and with one of said digit conductors, and to cause said locking device to lock said brushes in position.

3. In an apparatus of the class described, the combination with value setting devices, and a plurality of reciprocable actuators differentially controlled by said value setting devices; of switching devices movable by said actuators during advancement thereof, a carrier, a pair of superposed plates of insulating material on said carrier, a plurality of column conductors on the one of said plates located nearest said switching devices, said column conductors extending parallel to the path of movement of said switching devices, a plurality of digit conductors on the other of said plates, said digit conductors extending transversely to the path of movement of said switching devices, openings in said nearest plate whereby portions of said switching devices may extend therethrough, a locking device carried by said carrier and adapted to lock said switching devices in position, and means for moving said carrier toward said switching device whereby to concurrently engage each of said switching devices with one of said column conductors and with one of said digit conductors and to cause said locking device to lock said switching devices in position.

4. In an apparatus of the class described, the combination with a machine including value setting devices and a reciprocable actuator differentially controlled by said value setting devices; and a value registering device including a plurality of registering units adapted to register data to represent the numerical position to which said actuator is advanced, and normally open actuating circuits for respective ones of said registering units, each of said circuits including a conductor; of a carrier for said conductor, means including a movable contact device adapted to engage any of said conductors to condition the respective circuit, said movable contact device being successively movable by said actuator during advancement thereof into alignment with different ones of said conductors but out of engagement therewith, a locking device carried by said carrier, and means operable after advancement of said actuator and before return thereof for moving said carrier to cause said locking device to lock said contact device against movement and to engage said contact device with an aligned one of said conductors.

5. In an apparatus of the class described, the combination with value setting devices, and a plurality of reciprocable actuators differentially controlled by said value setting devices; of slides carried by said actuators and movable a limited amount relative thereto, spring means normally maintaining each of said slides at one extreme of its movement, electrical bridging brushes on said slides, a pair of superposed plates of insulating material adjacent said brushes, a plurality of column conductors on the one of said plates located nearest said brushes, said column conductors extending parallel to the paths of movement of said switching devices, a plurality of digit conductors on the other of said plates, said digit conductors extending transversely to the paths of movement of said brushes, openings in said nearest plate whereby portions of said brushes may extend therethrough, a locking device integral with said plates and adapted to lock said slides in position against the action of said spring means during movement of said actuators, and means for moving said plates toward said brushes whereby to concurrently engage each of said brushes with one of said column conductors and with one of said digit conductors and to cause said locking device to lock said brushes in position.

6. In an apparatus of the class described, the combination with value setting devices, and a plurality of reciprocable actuators differentially controlled by said value setting devices; of toothed slides carried by said actuators and movable a limited amount relative thereto, spring means normally maintaining each of said slides at one extreme of its movement, electrical bridging brushes on said slides, a carrier, a pair of superposed plates of insulating material on said carrier, a plurality of column conductors on the one of said plates located nearest said brushes, said column conductors extending parallel to the paths of movement of said slides, a plurality of digit conductors on the other of said plates, said digit conductors extending transversely to the path of movement of said slides, openings in said nearest plate whereby portions of said brushes may extend therethrough, a locking device on said carrier adapted to engage teeth of said slides whereby to lock said slides against the action of said spring means during movement of said actuators, and means for moving said carrier toward said brushes whereby to concurrently engage each of said brushes with one of said column conductors and with one of said digit conductors and to engage said locking device with the teeth of said slides.

References Cited in the file of this patent

UNITED STATES PATENTS

| | | |
|---|---|---|
| 1,166,517 | Goldberg | Jan. 4, 1916 |
| 1,834,561 | Watson | Dec. 1, 1931 |
| 1,837,693 | Tracy | Dec. 22, 1931 |
| 1,875,234 | Grant | Aug. 30, 1932 |
| 2,240,549 | Carroll | May 6, 1941 |
| 2,285,353 | Peirce | June 2, 1942 |
| 2,289,055 | Landsiedel | July 7, 1942 |
| 2,614,632 | Clos | Oct. 21, 1952 |
| 2,660,370 | Daly et al. | Nov. 24, 1953 |